E. HAAGN.
CONTACTING DEVICE FOR ELECTRICAL MEASURING AND INDICATING INSTRUMENTS.
APPLICATION FILED DEC. 21, 1907.
1,004,420. Patented Sept. 26, 1911.
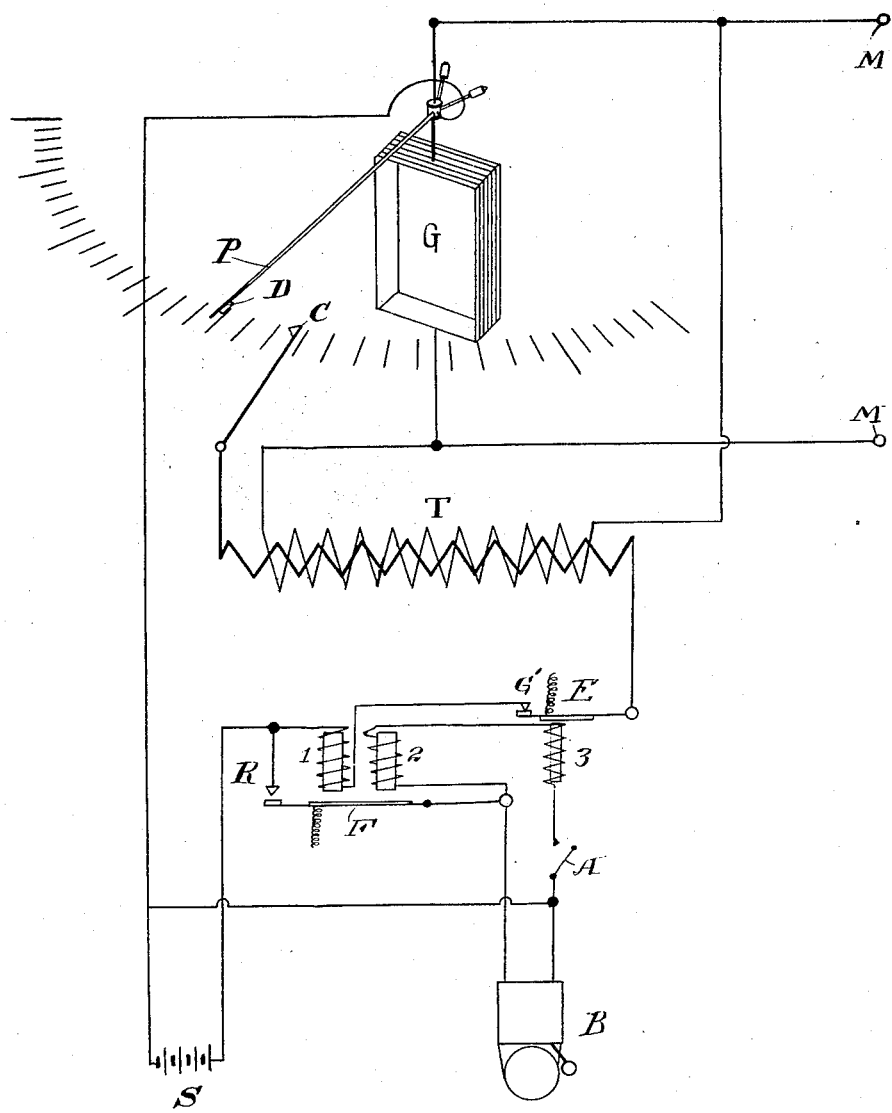

UNITED STATES PATENT OFFICE.

ERNST HAAGN, OF HANAU, GERMANY, ASSIGNOR TO THE FIRM OF W. C. HERAEUS, OF HANAU, GERMANY.

CONTACTING DEVICE FOR ELECTRICAL MEASURING AND INDICATING INSTRUMENTS.

1,004,420. Specification of Letters Patent. Patented Sept. 26, 1911.

Application filed December 21, 1907. Serial No. 407,480.

*To all whom it may concern:*

Be it known that I, ERNST HAAGN, a subject of the German Emperor, and resident of Hanau-on-the-Main, Germany, have invented certain new and useful Improvements in Contacting Devices for Electrical Measuring and Indicating Instruments, of which the following is a specification.

In electrical measuring instruments it is often desirable to provide an indicator which will indicate when the quantity measured reaches a certain value or falls above and below a certain value. This is generally accomplished by providing the movable element of the instrument, and more specifically the pointer connected thereto, with a contact which coöperates with a stationary contact and which closes an indicator circuit. Since the movement of the pointer is however exceedingly slow at times, thereby causing the contacts to gradually approach and separate, it will be seen that arcing will take place even if the current is low, causing the contacts to corrode and adhere. In view of the fact that the movable element is necessarily delicate this corrosion and adherence will not only seriously affect the sensitiveness of the instrument, but will also render the instrument inaccurate just at the point where accuracy is most desired, namely, the indicated point.

The objects of this invention are therefore to construct an instrument which will not be open to these objectionable features and which will avoid all adherence and corrosion of the contacts.

In accordance with this invention the instrument is so constructed that when the indicating circuit containing the contacts is closed it is immediately and quickly opened at another point and the movable element is given an impulse so as to move the contacts away from each other. In order to provide additional security against arcing the indicator is in a local circuit which is closed by the contact circuit.

The invention will now be described in connection with the accompanying drawings, in which the figure is a diagram of the instrument embodying this invention.

The instrument here shown is an ordinary measuring instrument of the movable coil or D'Arsonval type. The movable element or coil G is connected across the binding post M of the instrument and has secured to it so as to move therewith a pointer P which moves over a scale, as shown in the diagram. The D'Arsonval type of instrument is well known and so it is unnecessary to describe it in detail, but the invention is not necessarily limited to this specific type of measuring instrument. It is often desirable to indicate when the pointer P reaches a certain point on the scale, or, in other words, when the measured quantity reaches a certain value. The instrument is therefore provided with a stationary contact C which is arranged to be engaged by a wiping movable contact D connected to the movable element of the instrument and, preferably, to the pointer P as shown. The contacts are connected in circuit with a suitable indicator so that the coöperation of these contacts will close the indicator circuit and notify the attendant. It will however be seen that the breaking of the contact will cause an arc since the movements of the pointer are often exceedingly slow when the increase or decrease of the current voltage, etc., is slow. This results in the corrosion and adherence of the contacts even though the current be small, since the accumulative effects will necessarily in time result in damaging or roughening the coöperating surfaces of the contacts.

A transformer T has its primary connected in circuit with the contacts and its secondary in parallel with the movable element of the instrument. The secondary is of high resistance so as to limit the current flow through it and not to affect the reading of the instrument, and the resistance of this secondary is taken into consideration when the instrument is standardized. The primary of the transformer and the contacts C and D have connected in series circuit therewith a battery S, a relay or magnet core 1, and a switch device G'. Local circuits consisting of a bell or other suitable indicator B, and magnet or relay windings 2 and 3 are connected across the terminals of the battery S. A switch R is arranged to close both circuits and the circuit of 2 and 3 is arranged to be opened by an auxiliary switch A. The switch G' is controlled by the magnet 3 which is arranged to attract the armature E carrying one of the contacts of the switch, the switch being normally held closed by a spring, as shown in the drawing. The switch R is arranged to be closed by the magnet winding 1, which attracts the armature F, carrying one of the contacts of the switch and the switch is normally held open by a spring as shown in the drawing. The magnet winding 2 is also arranged to attract the armature F to hold the switch R closed.

The parts of the instrument are normally in the position shown in the drawing. If the current rises to the indicated value the contacts C and D will coöperate to close the contact circuit. This will cause the current from the battery S to flow from the left-hand terminal, through the pointer P, to contact D, to contact C, through the primary of the transformer T, through the switch G', and through the magnet winding 1, back to the right-hand terminal of the battery. This will cause the magnet or relay winding 1 to become energized so as to close the switch R, thereby closing the local circuits including the indicator and the windings 2 and 3, the current flowing from the left-hand terminal through the indicator B and the windings 2 and 3 in parallel and back through the switch R to the right-hand terminal of the battery. The closing of this local circuit will have three effects: First, it will open the switch G' so as to open the circuit through the contacts C, D; second, it will actuate the indicator; and third, it will cause the magnet winding 2 to attract the armature F and hold the switch R closed after the circuit through winding 1 has been broken. The closing of the contacts C, D, and the passage of the current through the primary of the transformer T will cause a secondary current to be induced in the secondary of the transformer. The connections are so made that the polarity of the secondary current is in a direction opposite to the line or measured current through the movable element when the circuit in the primary is made so that this movable element will be given an impulse to quickly separate the contacts and thereby furnish additional security for the prevention of arcing and corrosion at the contacts C, D. When the pointer swings back after the impulse has been given to it, and after the current in the secondary of the transformer has died out, and the circuit through C, D has been broken at G', no further arcing can take place. After the mechanism has been set in operation to operate the indicator B, the local circuit of the indicator will remain closed until the attendant opens the switch A.

It will thus be seen that this invention attains the desired objects. The circuit through the contacts C and D is broken by an auxiliary switch G' and a movement is transmitted to the movable element of the instrument so as to quickly separate the contacts, and the current is further maintained at a low value by placing the indicator in a local circuit, the resistance of the contact circuit being made large enough so that the current will be held down to a small value. This has the additional advantage that the indicator can be maintained in operation so that it will keep the bell ringing or keep every indicator device in position until the attendant is notified.

I claim—

1. An electrical measuring and indicating instrument comprising in combination, a movable measuring element, a contact carried thereby, a coöperating stationary contact, an electrical circuit including said contacts, an indicator, means in said circuit for operating said indicator, and means operating by the closing of said contacts for transmitting an impulse to said movable element so as to separate said contacts.

2. In an electrical measuring and indicating instrument, the combination with the movable element, of a contact carried thereby, a coöperating stationary contact, an electrical circuit including said contacts, an indicator, means in said circuit for operating said indicator, and inductively operated means acting upon the movable element to move the same so as to separate said contacts, said means being set in operation by the closing of said contacts.

3. In an electrical measuring and indicating instrument, the combination with the current carrying means of the instrument including a movable element, of a contact carried thereby, a coöperating stationary contact, an indicator, means connected in a circuit with said contacts for operating the said indicator, and a transformer having its primary connected in said circuit and its secondary in circuit with the current carrying means.

4. In an electrical measuring and indicating instrument, the combination with the movable element, of a contact carried thereby, a coöperating stationary contact, and a transformer having its primary connected in a circuit with said contacts and its secondary, in circuit with said moving element.

5. In an electrical measuring and indicating instrument, the combination with the current carrying means of the instrument including a movable element, of a contact carried thereby, a coöperating stationary contact, a transformer comprising a primary connected in a circuit with said contacts, and a high resistance secondary connected in shunt with the current carrying means, and connections whereby the current flowing in said secondary opposes the measured current.

6. In an electrical measuring and indicating instrument, the combination with the movable element, of a contact carried thereby, a coöperating stationary contact, an electrical circuit including said contacts, an indicator, means connected in said circuit for operating said indicator, and means operating by the closing of said contacts for opening said circuit and for transmitting an impulse to said movable element to separate said contacts.

7. In an electrical measuring and indicating instrument, the combination with the movable element, of a contact carried thereby, a coöperating stationary contact, an electrical circuit including said contacts, an indicator, means connected in said circuit for operating said indicator, and means operating by the closing of said contacts for opening said circuit.

8. In an electrical measuring and indicating instrument, the combination with the movable element, of a contact carried thereby, a coöperating stationary contact, an electrical circuit including said contacts, an indicator, means connected in said circuit for operating said indicator, means for maintaining said indicator in operation independent of said circuit, and means operating by the closing of said contacts for opening said circuit.

9. In an electrical measuring and indicating instrument, the combination with the movable element, of a contact carried thereby, a coöperating stationary element, an electrical circuit including said contacts, an indicator, means connected in said circuit for operating said indicator, a transformer having its primary connected in said circuit and its secondary in circuit with the instrument, and means for opening said circuit including said contacts when said contacts are closed.

10. In an electrical measuring and indicating instrument, the combination with the movable element, of a contact carried thereby, a coöperating stationary element, an electrical circuit including said contacts, an indicator, a local circuit for operating said indicator, an electro-magnet in said contact circuit for closing the local circuit, and electro-magnets in said local circuit, one for maintaining said local circuit closed and another for opening said contact circuit.

11. An electrical measuring and indicating instrument comprising a movable element including a coil, a transformer having its secondary winding connected with the coil of the movable element, a relatively stationary contact, a circuit including said contact and the primary winding of the transformer, a pointer connected to be moved by the movable element to and from said contact and having a contact which is included in the circuit containing the primary winding of the transformer, and an indicator controlled by the circuit including the primary winding of the transformer.

12. An electrical measuring and indicating instrument comprising a movable element including a coil, a transformer having its secondary winding connected with the coil of the movable element, a relatively stationary contact, a circuit including said contact and the primary winding of the transformer, a pointer movable by the movable element to and from said contact and having a contact which is included in the circuit containing the primary winding of the transformer, a bell circuit including a movable member, a coil in the circuit including the primary winding of the transformer, adapted to adjust said movable member of the bell circuit to close the last said circuit means in said bell circuit for breaking the primary winding of the transformer when the bell circuit is closed, a supplemental means for maintaining the bell circuit closed after the circuit including the primary winding of the transformer is broken.

In testimony whereof I have signed my name to this specification in the presence of two subscribing witnesses.

ERNST HAAGN.

Witnesses:
 JEAN GRUND,
 CARL GRUND.